No. 783,870. PATENTED FEB. 28, 1905.
E. C. KNAPP.
SELF OILING BEARING.
APPLICATION FILED MAY 28, 1901.

WITNESSES:

INVENTOR,
Edwin C. Knapp.

No. 783,870.

Patented February 28, 1905.

UNITED STATES PATENT OFFICE.

EDWIN C. KNAPP, OF SYRACUSE, NEW YORK.

SELF-OILING BEARING.

SPECIFICATION forming part of Letters Patent No. 783,870, dated February 28, 1905.

Application filed May 28, 1901. Serial No. 62,211.

*To all whom it may concern:*

Be it known that I, EDWIN C. KNAPP, a citizen of the United States, residing at Syracuse, in the county of Onondaga and State of New York, have invented a new and useful Self-Oiling Bearing, of which the following is a specification.

In modern machinery, where minimum attendance is a desirable feature, self-oiling bearings become a necessity. In the usual construction of these bearings an opening is provided in the bearing-surface through which oil is carried by various means from an oil-reservoir situated below the bearing.

To provide with very simple construction a bearing which shall without opening in its bearing-surface supply a perfectly-filtered lubricant directly to the part of the bearing where needed in quantities sufficient for lubrication without waste of any kind is the object of the device described in this specification and shown in its accompanying drawings, in which—

Figure 1:
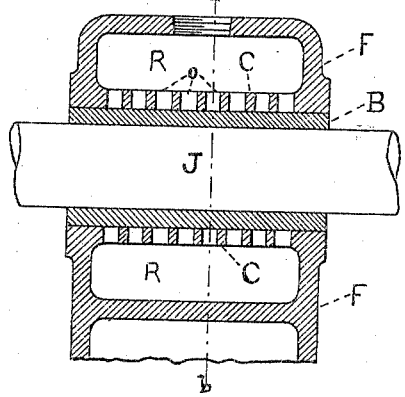
Figure 3:
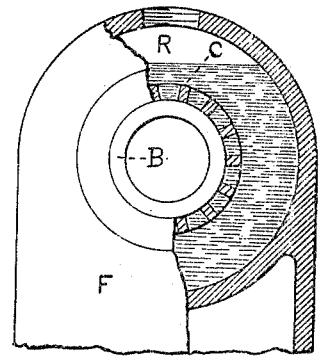
Figure 2:
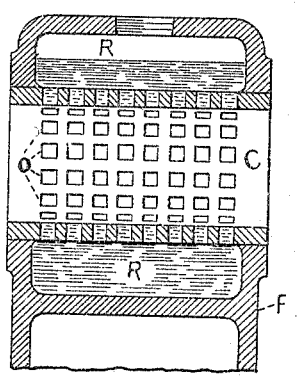
Figure 4:
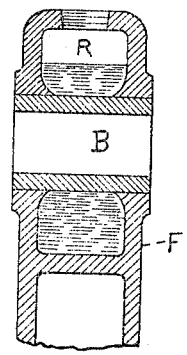

Figure 1 is a longitudinal section showing the bearing with journal or sliding member in place. Fig. 2 is also a longitudinal section with the bushing B removed to disclose more plainly the construction of the cage C. Fig. 3 is a part transverse section on line *a b*, Fig. 1; and Fig. 4 is a longitudinal section of a bearing, showing the cage C omitted, as it may be in a small bearing where the walls of the bushing B are sufficiently strong without reinforcement.

Referring to the several views, J is the journal or sliding member of the machine to be provided with a suitable bearing and lubrication.

B is a bushing which forms the bearing-surface and separates the bearing-surface from the oil-reservoir R, which may completely surround said bushing.

F is part of the supporting member of the machine, and C is a cage used when necessary to give extra support to the exterior of the bushing B. The cage C is provided with openings *o o o*, through which oil is freely admitted to the exterior surface of the bushing B. This cage may be formed integrally with its supporting-frame F, as shown in Fig. 1, or it may be formed separately and fitted into place as shown in Fig. 2. When formed of a separate piece, it is most conveniently made of a tube with round perforations.

The bushing B is composed of an absorbent material possessing sufficient wearing and antifriction properties, the best example of which is rawhide. Reservoir R is normally supplied with oil, as indicated in the figures, which lies in contact with the exterior of the wall or bushing B, which absorbs through the substance of its walls the oil necessary for lubrication and supplies it directly to the bearing-surface where needed.

I am aware that bearings have been devised having openings in the bearing-surface through which oil is conveyed by mechanical means and by capillary attraction of wicks and other fibrous materials introduced for that purpose only. I am not, however, aware of any device in which the wall of the bearing itself absorbs through its substance the oil necessary for its own lubrication.

Having thus fully described my invention and its mode of operation, what I claim is—

1. A self-oiling bearing, comprising a chambered member, and a journal-sleeve extending completely through said chambered member and consisting of a continuous imperforate piece of absorbent material constituting the sole contacting surface of the bearing against the shaft or journal.

2. A self-oiling bearing, comprising a chambered member and an imperforate sleeve of absorbent material extending through the full length of the chambered member so as to be enveloped by oil therein, said sleeve constituting the sole contacting surface for a journal passing through it.

3. A self-oiling bearing, comprising a chambered member, an annular perforated wall extending from end to end of said chamber and an imperforate sleeve of absorbent material extending through the full length of said perforated frame and constituting the sole contacting surface for a shaft or journal.

4. A self-oiling bearing comprising a member having an oil-chamber therein and an imperforated sleeve of rawhide extending centrally through the full length of said oil-chamber so as to be enveloped by the oil therein and constituting the sole contacting surface of a journal mounted in said bearing.

EDWIN C. KNAPP.

Witnesses:
   Wm. F. Fitzgerald,
   N. Amneus.